Nov. 17, 1964   B. HOWARD   3,157,062
COMPENSATOR FOR CHAIN WEAR
Filed Feb. 8, 1962   2 Sheets-Sheet 1
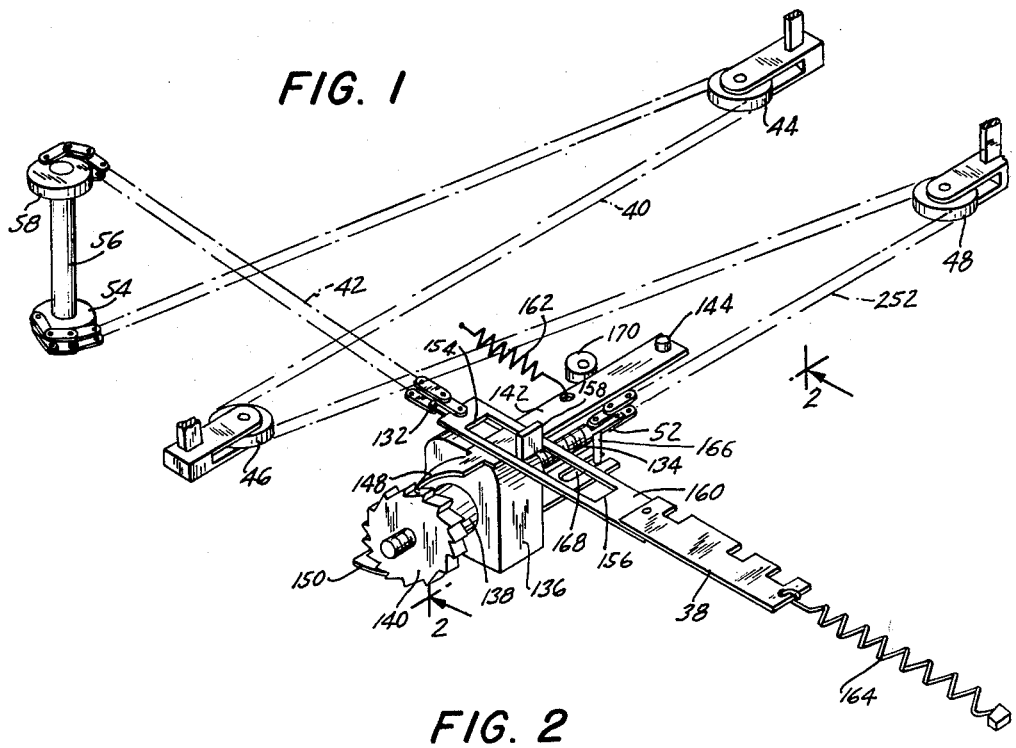
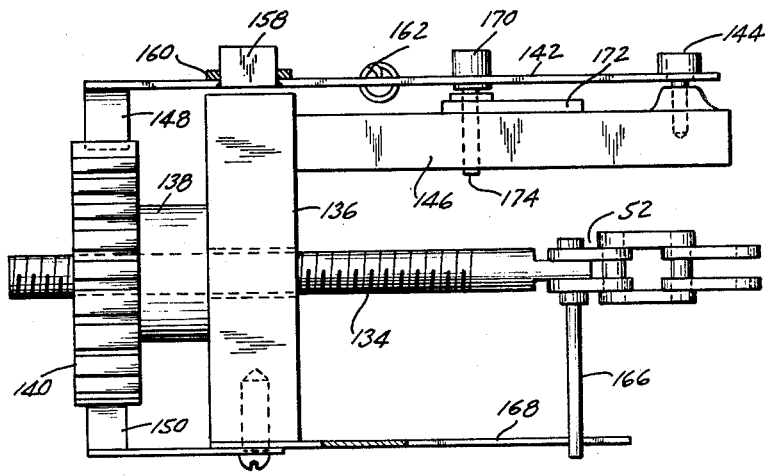
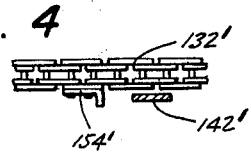
INVENTOR.
BERNARD HOWARD
BY James and Franklin
ATTORNEYS

INVENTOR.
BERNARD HOWARD

United States Patent Office 3,157,062
Patented Nov. 17, 1964

3,157,062
COMPENSATOR FOR CHAIN WEAR
Bernard Howard, Upper Saddle River, N.J., assignor to Mite Corporation, New Haven, Conn., a corporation of Delaware
Filed Feb. 8, 1962, Ser. No. 171,910
6 Claims. (Cl. 74—501.5)

This invention relates to compensation for the undesired elongation of a strand having a fixed end and a movable end, and which is effectively shortened or lengthened by desired amounts the length of which is critical.

There are mechanisms which comprise a flexible strand which is fixed at one end, and movable at its other end under the influence of means intermediate the ends to effectively shorten or lengthen the strand. The material of the strand, even if carefully selected, acquires undesired elongation after repeated flexing, and even a chain made of hardened steel parts tends to wear at the pivots and thus lengthens. This undesired lengthening may, for convenience, be called "stretch," to distinguish it from the effective and desired lengthening and shortening of the strand as a part of the normal operation of the mechanism.

The general object of the present invention is to improve such mechanisms by the provision of means to automatically compensate for stretch. A more specific object is to provide means to automatically take up stretch of the strand whenever the stretch reaches a predetermined small amount. The extreme long position of the strand is employed to sense the existence of the excessive stretch and to initiate the compensation.

The invention is disclosed as applied to a telegraph printer in which a type body is moved by a flexible strand connected thereto, and in which the effective length of the strand is varied by means of a plurality of pulleys around which the strand is reversely threaded. These pulleys are moved between "in" and "out" positions in response to received telegraph pulses, the motion of each pulley being double that of a preceding pulley. The movement of the type body depends on the sum of the movements of the different pulleys, and thus the device may be called an "aggregate motion" device. One object of the invention is to provide stretch compensating means for such a telegraph printer, and more particularly a printer of the type disclosed in my U.S. Patent 2,942,065, issued June 21, 1960, and entitled "Telegraph Printer."

In the said printer the strand moves a function slide as well as the type body. The function slide has notches which, on appropriate signal, are aligned with notches in another such slide to produce a special function, and the position of the function slide therefore must be accurately predetermined. In the said printer a chain has been threaded back and forth around the movable pulleys, and then connected to the function slide. The remainder of the strand may be nylon cord or ribbon leading to the type body. Wear of the pulleys or sprockets also results in an effect like chain wear. A further and more specific object of the invention is to compensate for chain wear at the function slide.

To accomplish the foregoing general objects, and other more specific objects which will hereinafter appear, my invention resides in the chain wear compensation mechanism and the elements thereof, as are hereinafter more particularly described in the following specification. The specification is accompanied by drawings in which:

FIG. 1 is a perspective schematic view showing a compensating mechanism embodying features of the invention;

FIG. 2 is a fragmentary partial section drawn to enlarged scale and taken approximately in the plane of the line 2—2 in FIG. 1;

FIG. 4 is a fragmentary view explanatory of a detail.

Figure 3:
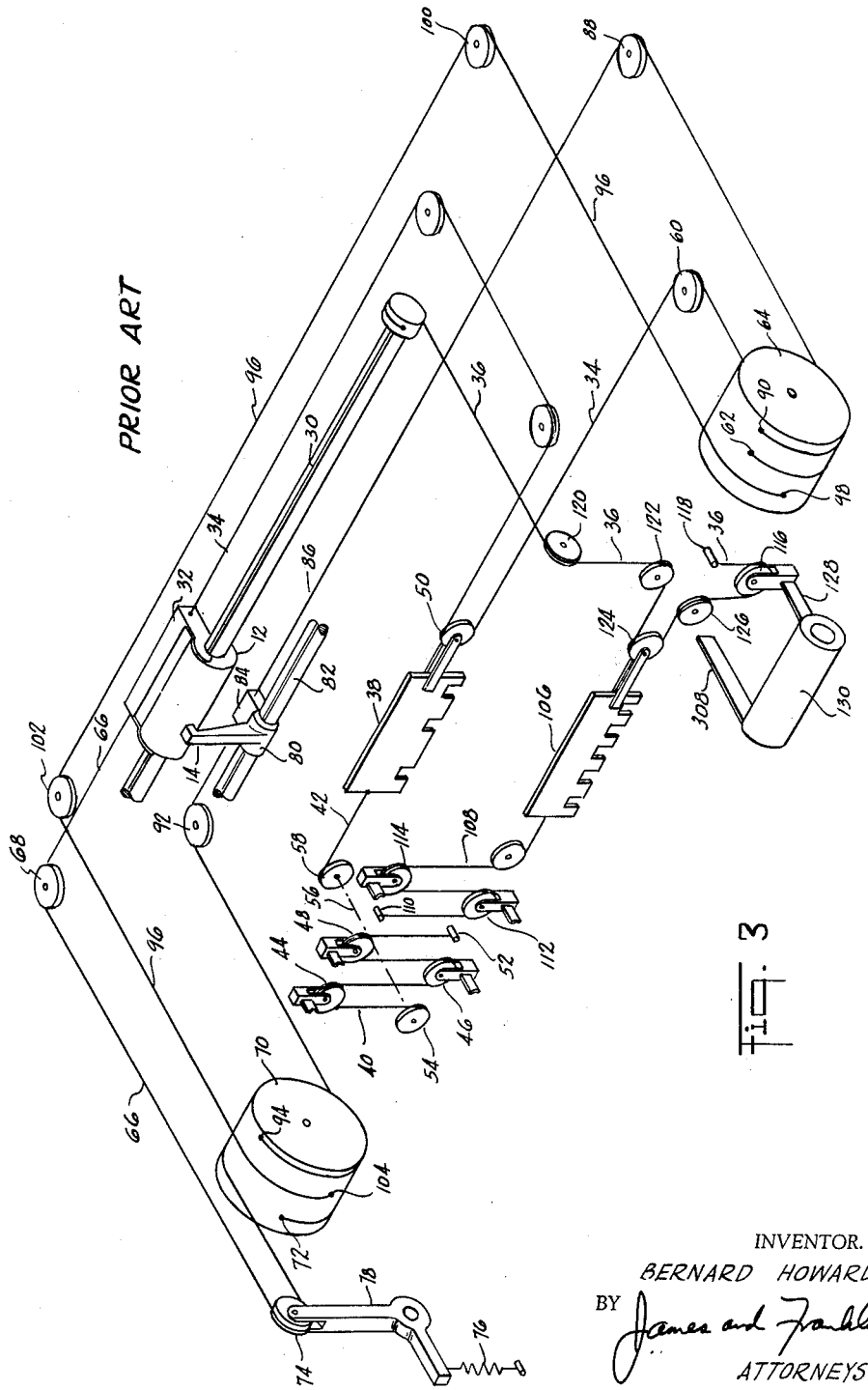
FIG. 3 is a perspective view showing the complete strand or cable mechanism of a printer to which the compensating mechanism has been applied.

Referring to the drawing, FIG. 3 is a diagrammatic view corresponding to FIG. 24 in my U.S. Patent 2,942,065 previously mentioned, and explains the cable system used in the telegraph printer disclosed in that patent.

Referring to FIG. 3, the type cylinder 12 is slidably keyed or splined for free axial movement on a shaft 30. It is axially moved by a yoke 32 connected to a cable 34. Shaft 30 is rotated by a cable 36. The type cylinder 12 has eight lines of characters, and each line is eight characters long. Cables 34 and 36 each provide eight selector positions.

These selector positions are determined by movement of groups of pulleys, each pulley having an "in" and an "out" position. The cable 34 is effectively divided into two parts on either side of and connected to, or in a sense separated by, a special function slide 38, the other cable part being indicated at 40. The latter for mechanical convenience is sidewardly offset from the part 42. The cable 40 is operated on by three movable pulleys 44, 46 and 48 carried at the ends of arms which are moved by half-revolution cams between "in" positions and "out" positions. The "in" position effectively lengthens the cable, and the "out" position effectively shortens the cable. The pulley motions are geometrically related, say $\%_4$ inch, $\%_2$ inch, and $\%_{16}$ inch, and in various combinations provide eight positions which are $\%_4$ inch apart. This motion is doubled by the action of pulley 50 on slide 38, thus providing eight positions which are $\%_2$ inch apart at the type cylinder 12.

One end of cable 40 is fixedly anchored at 52. The other end could be connected directly to slide 38, but because the latter is offset rearwardly somewhat, the end of cable 40 is connected instead to a wheel 54 connected by shaft 56 to a similar wheel 58, to which cable 42 is connected. The cables 40 and 42 are miniature roller chains, and the pulleys 44, 46, 48 and the wheels 54, 58 are sprocket wheels meshing with the chains 40 and 52. However, the cable 34 is light and flexible.

The cable 34 serves not only for character selection, but also for character feed, and for this purpose, after passing around the pulley 50 and a guide pulley 60, the end of cable 34 is connected at 62 to a character feed drum 64. The latter is moved in step-by-step fashion by appropriate pawl and ratchet mechanism, thus shortening the cable 34, and moving the type cylinder across the paper. This movement is accommodated by the cable 66, which is a continuation of cable 34, and which extends around a guide pulley 68 to a resilient take-up drum 70, the cable being connected at 72. This would require rapid back-and-forth movement of the take-up drum 70, to accommodate character selection, and to avoid this, the cable 66 is additionally passed around a preferably light-weight take-up pulley 74, yieldably urged to the left by a spring 76 operating on a pulley arm 78. Thus, the rapid but limited back-and-forth movement of the type cylinder for character selection may be accommodated by take-up pulley 74, while the long range step-by-step movement of the type cylinder for character feed across the paper is taken up by the drum 70.

This has an additional advantage in that identical character feed movement may be provided for the hammer 14. This is mounted on a hub 80 which is keyed or splined for free axial movement on a shaft 82, and is connected at 84 to a cable 86 which is guided around pulley 88 to character feed drum 64, to which it is connected at 90. At its other end, cable 86 is guided around pulley 92, and is connected at 94 to take-up drum 70.

A special return cable 96 insures identical movement of the drums 64 and 70. One end is connected at 98 to drum 64. After passing around guide pulleys 100 and 102, the other end is connected to take-up drum 70 at 104. The return cable 96 is wound on the drums in a direction opposite to that of the type cylinder and print hammer cables. In this way, the drums are tied together for simultaneous equal movement in either direction. The cable arrangement also insures separation of the character selector movement taken up by the pulley 74, and the character feed movement afforded by drum 70. Drum 70 turns with drum 64, and without moving take-up pulley 74, because of the direct connections between the drums provided by the print hammer cable 86 and the return cable 96.

The cable 36 for rotating the type cylinder is similarly divided into two parts connected to and separated by a special function slide 106. The other part of the cable is indicated at 108, and its free end is fixedly secured at 110. The cable then passes around selector pulleys 112 and 114. There is a third selector pulley 116, but this operates on the cable 36, the free end of which is fixedly secured at 118. Starting at shaft 30, the cable 36 passes around guide pulleys 120 and 122, leading to a pulley 124 which is movable with slide 106. Cable 36 then passes around a guide pulley 126 leading to the third selector pulley 116. The latter is moved between "in" and "out" positions by an arm 128 oscillatable at 130. Here again, the "in" and "out" motions of pulleys 112, 114 and 116 are geometrically related, with the maximum motion provided by pulley 116, sufficient to rotate the type cylinder 12 through one half revolution. In the present case, one semi-cylindrical half of the type cylinder carries "letters," meaning the letters of the alphabet, while the other half of the cylinder carries "figures," meaning numerals, punctuation, etc. Thus, the motion of pulley 116 provides a selection as between "letters" and "figures," and this selection is obtained as a special function.

As before, the pulleys 112 and 114 are preferably sprocket wheels, and cable 108 is a mating roller chain. However, the cable 36 is a highly flexible but inelastic cord or tape, typically nylon.

The mechanism for moving the selector pulleys need not be described in detail herein, being shown in my aforesaid Patent 2,942,065.

The function slides 38 and 106 are located side by side, and have edge notches into which feelers can move when two such notches are in registration. Accurate location of the function slides is therefore important, and may be spoiled by "stretch."

Referring now to FIGS. 1 and 2, the parts have the same reference numerals as before. The chain 40 is threaded around movable pulleys 44, 46 and 48, and is fixed at the end 52. The movable end is secured to a wheel 54 turning a shaft 56, and an offset wheel 58 carries an additional length of chain 42 connected to a function slide 38. The pulleys 44, 46 and 48 are means intermediate the ends 52 and 132 to effectively shorten or lengthen the strand 40 in order to move the end 132, and with it the function slide 38.

The compensating means comprises a screw 134 to which the fixed end 52 of the strand is connected, with the axis of the screw extending in the same direction as the end portion 252 of the strand. The screw passes freely through a fixed abutment or bearing 136, and on the opposite side receives a nut 138. A ratchet wheel 140 may be connected to, or is formed integrally with, the nut 138, and the parts 138 and 140 may be called a ratchet nut or an internally threaded ratchet wheel.

There is also a feed arm 142 pivoted at 144 on a fixed support 146 projecting from the bearing 136. The feed arm 142 carries a pawl 148 engaging the ratchet wheel 140. It is moved by a feed spring 162 which tends to pull it against a fixed stop 170. A check pawl 150 may be provided to prevent reverse motion. The pawls are shown simplified as spring metal, but in practice are pivoted.

The movable end of the strand, which may be referred to generally as 132 and 38, is provided with an abutment or "projection" 154, which abutment cooperates with a part of the feed arm 142, in this case a lug or protuberance 158. The part or "projection" 154 in this case is formed by using a metal slide 160 which is slotted to receive the lug 158, in which case the end 154 of the slot becomes the abutment which engages the lug 158. However, the simplest form is shown in FIG. 4 in which chain end 132′ carries a projection 154′ to engage the feed arm 142′, and the part 154 is therefore called a projection. In FIG. 4 the right end of the chain is assumed to be connected directly to the function slide 38 (FIG. 1) with no slotted slide 160 therebetween.

The spacing between the ends 154 and 156 of the slot, that is, the length of the slot, allowing for the thickness of the lug 158, is made greater than the maximum intended reciprocation of the function slide 38. Of course, if the chain 132 has a downward projection as in FIG. 4 this distance or minimum clearance need not be considered at all.

The projection 154 (FIG. 1) is so located that it approaches the lug 158 when the strand is effectively lengthened its maximum intended amount by the pulleys. If the strand gradually acquires an additional undesired stretch, the part 154 engages and moves the feed arm, until that motion becomes sufficient to move the pawl 148 back of the next tooth of the ratchet wheel.

Thus, whenever the strand reaches its extreme "long" position, that is, whenever the pulleys 44, 46 and 48 all are in their "in" position, the projection 154 senses whether excessive stretch exists.

When the strand moves back, whether a short or long amount, the feed arm is pulled back by the feed spring 162. The resulting movement turns the ratchet wheel a bit, and so moves the screw 134 axially a minute amount. The effective direction of the ratchet wheel and of the thread on the screw are so related that the axial movement of the screw shortens the strand and thereby tends to compensate for the undesired stretch. In the present case the screw is a left hand screw. The compensation brings the function slide 38 back to initial desired position, until the chain wear again becomes great enough for the pawl to engage another ratchet tooth.

When as in the present case, the travel of the slide 38 is caused by a take up spring, schematically indicated at 164, the spring 164 dominates the spring 162. In the telegraph printer of FIG. 3 the take up spring corresponding to spring 164 in FIG. 1 is located more remotely, and beyond the type body. Referring to FIG. 3, it will be recalled that the function slide 38 is coupled by pulley 50 to cable 34 leading to type body 12, and the latter is connected to cable 66 which extends to a take up drum 70 having a take up spring inside to rotate the drum. This take up spring in drum 70 corresponds to spring 164 in FIG. 1, and dominates the feed pawl spring 162 shown in FIG. 1.

In FIGS. 1 and 2 a pin 166 is movable in a slot 168 and serves merely to prevent rotation of the screw 134.

For adjustment of the relative location of the projection 154 and lug 158, I find it convenient to adjust the position of lug 158, and this is done by means of an eccentric stop 170. An arm 172 (FIG. 2) secured to the spindle 174 of eccentric 170 may be turned to turn the eccentric, and then may be locked in position.

The invention utilizes the right hand or "long" position of the chain to sense the existence of any excessive elongation. When this is great enough to engage a tooth, any movement in return direction of the chain permits the feed spring 162 to take up some of the wear. The thread of the screw 134 is a fine thread because the amount of wear to be taken up is very small at any one time. The motion of the screw is therefore irreversible.

The mechanism shown in FIG. 1 has been described as applied to that cable in FIG. 3 which causes axial movement of the type body, that is, the screw 134 (FIG. 1) replaces the post 52 (FIG. 3). It will be understood, however, that similar mechanism is applicable to the chain 108 passing around pulleys 112 and 114, so as to take up wear of that chain which causes rotational movement of the type body. In such case the screw 134 (FIG. 1) replaces the post 110 (FIG. 3).

By locating the compensating mechanism near the takeup drum, it could be made to compensate for elongation of the nylon cord or tape, as well as the chain. However, in practice no difficulty has been caused by the cord leading to the type body, partly because any resulting change causes a displacement relative to the sheet of paper, which is unimportant, whereas a change at the function slide may interfere with proper operation of the machine.

It is believed that the construction and method of operation, as well as the advantages of my improved compensation mechanism, will be apparent from the foregoing detailed description. The screw 134 may be a right hand screw, with the ratchet teeth of the wheel 140 and the pawl 148 facing in opposite direction, although I prefer to provide the compensation on the return movement, as here shown. The ratchet wheel may be applied to rotation of the screw instead of the nut, with a collar or rotatable connection provided between the chain and the screw. A projection on the chain may be employed without a slotted plate, to move the feed arm, as shown in FIG. 4.

It will therefore be apparent that while I have shown and described the invention in a preferred form, changes may be made in the structure shown without departing from the scope of the invention as sought to be defined in the following claims. In the claims the reference to a flexible strand is intended to apply to a cable, belt, tape, chain, or other such strand. The reference to the strand having one fixed end is intended in a relative rather than an absolute sense. It is fixed except for the very slight occasional takeup motion here provided. The term "stretch" applies to any undesired elongation, including an elongation caused by wear at the pivots of a chain, and wear of the pulleys or sprockets carrying the chain, such that they are effectively reduced in diameter. Any reference in the claims to rotation of the nut by a ratchet wheel is not intended to exclude the obvious equivalent in which the nut is stationary and the ratchet wheel rotates the screw. The term "telegraph printer" is not intended to exclude response by the printer to code pulses originating locally instead of at a distance.

I claim:

1. In a mechanism comprising a flexible strand which is fixed at one end and movable back and forth at its other end under the influence of means intermediate the ends to effectively shorten or lengthen the strand, a compensating means to compensate for undesired stretch of the strand, said compensating means comprising a screw to which the fixed end of the strand is connected, with the axis of the screw extending in the same direction as the end portion of the strand, a nut on said screw, a ratchet wheel operatively connected to said nut to rotate the nut, a feed arm carrying a pawl for engaging said ratchet wheel, and a projection at the movable end of the strand, said projection being so located as to approach the feed arm when the strand is effectively lengthened, and to move the feed arm when the strand has acquired an additional undesired stretch, and the ratchet wheel and screw thread being so related that any ensuing axial movement of the screw shortens the strand and thereby tends to compensate for the undesired stretch.

2. In a mechanism comprising a flexible strand which is fixed at one end and movable back and forth at its other end under the influence of means intermediate the ends to effectively shorten or lengthen the strand, a compensating means to compensate for undesired stretch of the strand, said compensating means comprising a screw to which the fixed end of the strand is connected, with the axis of the screw extending in the same direction as the end portion of the strand, a nut on said screw, a ratchet wheel operatively connected to said nut to rotate the nut, a feed arm carrying a pawl for engaging said ratchet wheel, a feed spring connected to the feed arm, and a projection at the movable end of the strand, said projection being so located as to approach the feed arm when the strand is effectively lengthened, and to move the feed arm when the strand has acquired an additional undesired stretch, said feed arm being moved back by the feed spring when the strand is effectively shortened, and the ratchet wheel and screw thread being so related that any ensuing axial movement of the screw shortens the strand and thereby tends to compensate for the undesired stretch.

3. In a telegraph printer of the type in which a type body is moved back and forth by a flexible strand connected thereto and fixed at its other end, and in which the effective length of the strand is varied to move the type body by means of a plurality of pulleys around which the strand is reversely threaded and which pulleys are movable between in and out positions, a compensating means to compensate for stretch of the strand, said compensating means comprising a screw to which the fixed end of the strand is connected, with the axis of the screw extending in the same direction as the end portion of the strand, a nut on said screw, a ratchet wheel operatively connected to said nut to rotate the nut, a feed arm carrying a feed pawl for engaging said ratchet wheel, a projection at the movable end of the strand, and means on said feed arm approached by said projection upon maximum elongation of the strand, whereby motion at the projection exceeding its normal travel because of stretch of the strand causes movement of the feed arm, the direction of the ratchet and screw being so selected that any ensuing axial movement of the screw tends to compensate for the undesired stretch.

4. In a telegraph printer of the type in which a type body is moved back and forth by a flexible strand connected thereto and fixed at its other end, and in which the effective length of the strand is varied to move the type body by means of a plurality of pulleys around which the strand is reversely threaded and which pulleys are movable between in and out positions, a compensating means to compensate for stretch of the strand, said compensating means comprising a screw to which the fixed end of the strand is connected, with the axis of the screw extending in the same direction as the end portion of the strand, a nut on said screw, a ratchet wheel operatively connected to said nut to rotate the nut, a feed arm carrying a feed pawl for engaging said ratchet wheel, a feed spring connected to the feed arm, a projection at the movable end of the strand, and means on said feed arm approached by said projection upon maximum elongation of the strand, whereby motion at the projection exceeding its normal travel because of stretch of the strand causes movement of the feed arm, said feed arm being moved back by the feed spring when the projection moves back, the direction of the ratchet and screw being so selected that any ensuing axial movement of the screw tends to compensate for the undesired stretch.

5. In a telegraph printer of the type in which a type body is moved back and forth by a flexible strand connected thereto and fixed at its other end, and in which the effective length of the strand is varied to move the type body by means of a plurality of pulleys around which the strand is reversely threaded and which pulleys are movable between in and out positions, a compensating means to compensate for stretch of the strand, said compensating means comprising a screw to which the fixed end of the strand is connected, with the axis of the screw extending in the same direction as the end portion of the strand, a nut on said screw, a ratchet wheel operatively connected to said nut to rotate the nut, a feed arm carrying a feed pawl for engaging said ratchet wheel, a slide at the movable end of the strand, said slide having a slot exceeding in length the maximum travel of the strand and type body, and a lug on said feed arm received in said slot, whereby motion at the slide exceeding its normal maximum travel because of stretch of the strand causes a movement of the feed arm, the direction of the ratchet and screw being so selected that any ensuing axial movement of the screw tends to compensate for the undesired stretch.

6. In a telegraph printer of the type in which a type body is moved back and forth by a flexible strand connected thereto and fixed at its other end, and in which the effective length of the strand is varied to move the type body by means of a plurality of pulleys around which the strand is reversely threaded and which pulleys are movable between in and out positions, a compensating means to compensate for stretch of the strand, said means comprising a screw to which the fixed end of the strand is connected, with the axis of the screw extending in the same direction as the end portion of the strand, a nut on said screw, a ratchet wheel operatively connected to said nut to rotate the nut, a feed arm carrying a feed pawl for engaging said ratchet wheel, a feed spring connected to the feed arm, a slide at the movable end of the strand, said slide having a slot exceeding in length the maximum travel of the strand and type body, and a lug on said feed arm received in said slot, whereby motion at the slide exceeding its normal maximum travel because of stretch of the strand causes a movement of the feed arm, said feed arm being moved back by the feed spring when the slide moves back, the direction of the ratchet and screw being so selected that any ensuing axial movement of the screw tends to compensate for the undesired stretch.

References Cited in the file of this patent
UNITED STATES PATENTS

| | | |
|---|---|---|
| 893,220 | Anderson | July 14, 1908 |
| 2,838,142 | Dorey | June 10, 1958 |
| 3,016,761 | Wrighton et al. | Jan. 16, 1962 |